3,461,088
PRODUCTION OF EXPANDED
PLASTICS MOLDINGS
Erhard Stahnecker, Ziegelhausen, and Johannes Grohmann, Ludwigshafen (Rhine), Germany, assignors to Badische Anilin- & Soda-Fabrik Aktiengesellschaft, Ludwigshafen (Rhine), Germany
No Drawing. Filed July 8, 1966, Ser. No. 563,697
Claims priority, application Germany, July 10, 1965, B 82,776
Int. Cl. C08f 47/10
U.S. Cl. 260—2.5          2 Claims

ABSTRACT OF THE DISCLOSURE

A process for reducing the cooling time in the production of expanded styrene polymer moldings. In the process, styrene polymer beads which have been or are being pre-expanded are coated with an organic compound having a boiling point of more than 95° C. and a softening point of not more than 120° C. Where the coating takes place during or subsequent to the pre-expansion step rather than prior to pre-expansion the cooling time needed in the production of expanded styrene polymer moldings is substantially reduced. This is true even though only from 0.01 to 2% of the organic compound is used based on the weight of the styrene polymer.

---

The invention relates to an improved method for the production of expanded plastics moldings by heating expandable styrene polymers in molds.

According to a method which has been very successfully introduced into industry, moldings are prepared from expandable styrene polymers by expanding particulate styrene polymers in molds. In this method the particulate styrene polymers are first heated with steam or hot gas to a temperature above their softening point so that they expand to a loose aggregate. This step is known as pre-expansion. The pre-expanded styrene polymer is then kept for several hours and then further expanded in a perforated pressure-resistant mold by being heated again with superheated steam so that it fuses together to form a molding which corresponds in dimensions to the cavity of the mold used. This second step is known as molding. Following molding the molded article is cooled inside the mold. It has to be cooled until the interior of the molding has been cooled to a temperature lower than the softening point of the styrene polymer. Distortion may take place if the molding is removed prematurely from the mold.

It is known that by expanding particulate styrene polymers which contain a foaming agent and whose particles have been coated superficially with small amounts of an organic compound which dissolves or swells the styrene polymer, moldings are obtained which can be removed from the mold after a relatively short cooling period. It is a disadvantage, however, that particles coated with such organic compounds cannot be expanded as much as uncoated particles under comparable conditions. Moreover expanded plastics having an irregular cellular structure may be obtained upon expansion. This is particularly disadvantageous in the production of moldings which are to serve as decorative articles. Furthermore it has been found that the coated particles are particularly sensitive to pressure immediately after pre-expansion so that they may easily be deformed when conveyed pneumatically.

It is an object of the present invention to provide an improved method which enables the cooling periods to be shortened, i.e. the periods during which the molding has to remain in the mold. Another object of this invention is to provide pre-expanded coated particles which can be pneumatically conveyed without undergoing deformation. Other objects and advantages will become apparent in the following description.

We have now found that the objects of the invention are achieved when the pre-expanded styrene polymers are coated with a certain amount of an organic compound which is homogeneously miscible with the styrene polymer and has a boiling point of more than 95° C.

In a method for the production of an expanded plastic molding by heating a pre-expanded particulate, expandable styrene polymer containing a volatile organic compound which does not dissolve the styrene polymer and which has a boiling point below the softening point of the styrene polymer as a foaming agent in pressure-resistant molds which are not gas tight when closed to a temperature above the softening point of the styrene polymer, the improvement according to this invention comprises heating pre-expanded styrene polymers which have been coated during or after pre-expansion with 0.01 to 2% by weight of the polymers of an organic compound which does not substantially dissolve or swell the styrene polymer, said organic compound having a boiling point of more than 95° C. and a softening point of not more than 95° C. and a softening point of not more than 120° C.

The term "styrene polymer" for the purposes of the present invention means a normally solid polymer of unsubstituted styrene or a substituted styrene having the formula:

$$Ar-CH=CH_2$$

wherein Ar denotes an aromatic hydrocarbon radical. Examples of substituted styrenes are vinyltoluene, vinylxylene, ar-isopropenylstyrene, ar-tert. butylstyrene and α-methylstyrene and mixtures of these monomers with one another and/or with styrene. Styrene is preferably used.

The styrene polymer comprises in chemically combined form at least 50% and preferably at least 70% by weight of one of the styrenes. The term "styrene polymer" includes well-known addition copolymers of styrene or substituted styrenes with less than 50% and preferably less than 30% by weight of at least one other readily polymerizable olefinically unsaturated compound having the group $CH_2=C<$, such as α-methyl styrene nuclear chlorinated styrene, methacrylonitrile, acrylonitrile, esters of acrylic and methacrylic acid and alkanols having 1 to 8 carbon atoms, vinylpyridine, N-vinylcarbazole and butadiene. Examples of suitable copolymers are copolymers of 70 to 80% by weight of styrene and 20 to 30% by weight of acrylonitrile, 70 to 80% by weight of styrene and 20 to 30% by weight of α-methylstyrene, 75 to 85% of styrene and 75 to 25% by weight of methylmethacrylate, 90 to 95% by weight of vinyltoluene and 5 to 10% by weight of vinylpyridine. Copolymers of styrene, which contain in chemically combined form 0.001 to 1.0% and preferably 0.01 to 0.1% by weight of units of divinyl compounds such as divinylbenzene or butanedioldiacrylate can also be used in the process according to this invention.

The styrene polymers may contain additives, for example flame retardants, such as organic bromides which are well known as flameproofing agents. The organic bromides should preferably contain at least four carbon atoms and have a plurality (at least two) of bromine atoms attached to the carbon atoms. The bromine atoms shall constitute more than 40% by weight of the organic bromide.

Particularly suitable organic bromides are those which are not easily volatile, which have little or no plasticizing effect on the styrene polymers and which have no unpleasant odor. Organic bromides containing a plurality of bromine atoms in an aliphatic or a cycloaliphatic radical are very suitable. In these organic bromides the bromine atoms are preferably attached to adjacent or vicinal carbon atoms in the aliphatic or cycloaliphatic radical. Examples of suitable organic bromides are bromosubstituted alkanes such as 1,2,3,4-tetrabromobutane, 1,2,4-tribromobutane, tetrabromopentane, bromo-substituted cycloalkanes such as tribromotrichlorocyclohexane, tetrabromodichlorocyclohexane, pentabromomonochlorocyclohexane, hexabromocyclohexane, 1,2,5,6,9,10 - hexabromocyclododecane, octabromohexadecane; dibromoethylbenzene, 1,2-di(dibromomethyl)benzene and pentobromo di-phenyl ether; esters and acetals of dibromopropanol, such as tris - (2,3 - dibromopropyl)phosphate and esters of bromoalkanoic acids, such as methyl α,β-dibromopropionate. The bromination products of linear and cyclic oligomers and polymers of butadiene or isoprene, such as hexabromocyclododecane and octabromohexadecane, or brominated natural rubber or synthetic rubber are especially suitable.

The minimum amounts of the organic bromides to be employed in the composition are dependent upon the nature of the organic bromide and the nature of the styrene polymer. The organic bromides are preferably used in such amounts that the compositions or molding materials have a bromine content of at least 0.1% by weight and in most cases not more than 5% by weight, when synergists for the flame-proofing agents, such as ferrocene or organic peroxides having a high decomposition temperature are used. The styrene polymers may also contain other additives, e.g. dyes, fillers, antistatics or stabilizers.

The styrene polymers contain a foaming agent in homogeneous dispersion. Preferred foaming agents are gaseous or liquid organic compounds which do not dissolve the styrene polymer and whose boiling point is lower than the softening point of the polymer. Examples of suitable foaming agents are saturated aliphatic or cycloaliphatic hydrocarbons having 3 to 7 carbon atoms in the molecule, such as propane, butane, pentane, cyclopentane, hexane, cyclohexane or petroleum ether, or halohydrocarbons, preferably chlorohydrocarbons and fluorohydrocarbons, having 1 to 6 carbon atoms, such as dichlorodifluoromethane and trifluorochloromethane. Very suitable foaming agents have a molecular weight of at least 58 and a boiling temperature below 95° C. at 760 mm. Hg. The amount of foaming agent must be sufficient to expand the styrene polymer to form a cellular mass. The expanding agents are contained in the styrene polymers in general in amounts of from 3 to 15% by weight on the polymer.

The particulate styrene polymers may be for example in bead form, in the form of cylindrical granulates or in the form of lumps, such as are obtained by grinding bulk polymers. The particles advantageously have a diameter of 0.1 to 6 mm., particularly 0.4 to 3 mm.

The particulate styrene polymers are pre-expanded for example to ten to one hundred times their original size. The pre-expansion is carried out by conventional methods, for example by treatment of the particles containing expanding agents with steam.

The particulate pre-expanded styrene polymer is heated in a mold which is not gastight when closed. A mold which is not gastight when closed is defined as a mold from which gas, for example air, can escape but from which the expanding polymer cannot escape. The pre-expanded particles are advantageously heated with steam or with a mixture of steam and air. The procedure for pre-expanding and molding styrene polymers is well known in the art and is for example described by F. Stastny in the periodical "Kunststoffe," 44th year, 1954, pages 173 to 180, and in the periodical "Der Plastverarbeiter," 1954, pages 260 to 271. The methods are also described in the book "Die Technologie des schäumbaren Polystyrols" by H. L. v. Cube and K. E. Pohl, Heidelberg, 1965.

The pre-expanded particles are coated with 0.01 to 2%, preferably 0.05 to 0.7%, by weight on the styrene polymer of one or more organic compounds which are homogeneously miscible with the styrene polymer and have a boiling point of more than 95° C. The organic compounds should not dissolve or swell the styrene polymer. They may be distributed in the molecular structure of the polymer without substantially dissolving or swelling the polymer. The compounds used for coating are practically insoluble in water and, if they act as solvents, are used in such amounts that they practically do not dissolve the styrene polymer. Their softening point should not be above 120° C. Solid and liquid and chloroparaffins are particularly suitable, those having 7 to 20 carbon atoms being prefered, e.g. n-heptane, i-octane, n-dodecane, cyclododecane, cyclodecane, heptadecane and chlorinated derivatives and mixtures thereof being preferred. Esters of fatty acids and aliphatic hydrocarbons substituted by at least one hydroxy group, such as butanol, 2-ethylhexanol or glycerol, or aliphatic hydrocarbons substituted by at least one hydroxy group and in which at least one methylene group is substituted by an oxygen atom, i.e. an ether group, are also suitable. Examples are butyl stearate, ethoxyethyl acetate and glyceryl ester of palmitic acid. Esters of carbonic acid and alkanols are also suitable. Mono- and polyesters of polycarboxylic acids derived from alkanes or aromatic hydrocarbons of the benzene series by substitution of hydrogen atoms by at least two, preferably two, carboxy groups and of alcohols as defined above are also suitable. Examples are di-(2-ethylhexyl)-adipate, di-(methoxyethyl)-phthalate, polyesters of adipic acid and butylene glycol or of pentaerithritol and phthalic acid. Monocarboxylic and polycarboxylic acids derived from alkanes and aromatic hydrocarbons of the benzene series by substitution of at least one hydrogen atom by at least one carboxy group and especially fatty acids having 5 to 32 carbon atoms may also be used, such as oleic acid and stearic acid. Suitable organic compounds are also fats, natural oils, particularly fixed oils and waxes, such as olive oil, linseed oil, beeswax and montan wax; ethers containing in addition to the ether groups preferably only aliphatic hydrocarbon radicals and/or aromatic hydrocarbon radicals of the benzene series, such as diphenyl ether, glycol ethers of alkanols, water-insoluble ethers of polyethylene oxide and alkanols and water-insoluble polyvinylalkylethers having 1 to 4 carbon atoms in the alkyl radical; esters of inorganic acids, such as tricresylphosphate; and naphthalene or benzene derivatives such as tetrahydronaphthalene and nitrobenzene. Paraffins and also chloroparaffins are particularly suitable compounds of the said type.

Sometimes it is advantageous to use organic compounds which have a boiling point above 110° C., particularly when the pre-expanded particles are molded at relatively high temperatures.

The expandable styrene polymers may be coated during pre-expansion, immediately thereafter or after a storage period of any length of time. It is also possible to coat the particles in the perforated mold shortly prior to molding. The organic compounds may be applied undiluted in aqueous dispersion or emulsion or also diluted in an inert solvent which does not dissolve the styrene polymers. Examples of such solvents are lower alkanols, such as methanol. The particles are advantageously kept in motion in mixing equipment while the organic compounds are sprayed on to the polymer particles.

We have now found that moldings which have been prepared from coated pre-expanded particles by the process according to this invention can be removed from the molds after a relatively short cooling time. In particularly favorable cases, the molded article can be removed from the mold immediately after molding without there being any subsequent deformation. The pre-expanded coated particles to be used according to the invention can be pneumatically conveyed without any distortion occurring.

The invention is illustrated by the following examples. In the examples the cooling period is the time which elapses from the commencement of cooling after molding is over to the time when the molded article can be removed from the mold without subsequent deformation taking place. The cooling period is determined by the following method:

Pre-expanded styrene polymer is molded in a mold having a pressure probe at the midpoint. The time which elapses from the commencement of cooling of the mold to the time when the pressure in the interior of the mold has fallen to zero.

Example 1

Bead polystyrene which contains 6% by weight of pentane as expanding agent and whose particles have an average diameter of 0.8 to 2.3 mm. is mixed in a mixing vessel with 0.15 by weight of dimethyl glycol phthalate, on the styrene polymer. Four minutes later the coated polystyrene (b) is removed from the mixing vessel and pre-expanded with flowing steam at 150° C. in a pre-expansion vessel provided with stirring means, until the bulk density is 15 g./l. 4.5 minutes are required for this purpose.

For comparison, uncoated bead polystyrene containing expanding agent (a) is pre-expanded under the same conditions to a bulk density of 15 g./l. 2.5 minutes being required for the purpose.

Part of the pre-expanded uncoated polystyrene is kept for ten hours and then coated with 0.15% by weight on the styrene polymer of dimethyl glycol phthalate and this coated pre-expanded polystyrene (c) is kept for a period of fourteen hours.

Samples (a), (b) and (c) are conveyed pneumatically through a pipe for a distance of 50 meters. The pre-expanded uncoated polystyrene (a) and the polystyrene which has been coated after pre-expansion (c) undergo no external change during conveyance, whereas the particles of the pre-expanded coated polystyrene (b) are seriously deformed. The bulk density of this raw material after conveyance is 17 g./l.

Samples (a), (b) and (c) are kept for another twenty-four hours and then molded in molds having the dimensions 50 x 100 x 100 cm. by means of steam at 0.8 atmosphere gauge to form moldings. The cooling periods of the molded samples are as follows:

Raw material: Cooling period in minutes
(a) untreated beads pre-expanded _____ 140
(b) unexpanded beads coated with 0.15% of dimethyl glycol phthalate and then pre-expanded _____ 80
(c) pre-expanded beads stored for ten hours and then coated with 0.15% of dimethyl glycol phthalate _____ 40

Strips 2 mm. in thickness are cut from the middle of blocks. It is found that the cellular structure of the moldings prepared from raw materials (a) and (c) is uniform. The cellular structure of the molding prepared from sample (b) is irregular. Moreover the cells in the molding from sample (b) are considerably larger than in the case of samples (a) and (c).

Example 2

Bead polystyrene containing 6% by weight of pentane as expanding agent is pre-expanded to a bulk density of 15 g./l. kept for six hours, divided into six batches and each batch is coated with 0.15% by weight of one of the organic compounds specified in the following table. The samples are kept for another twenty-four hours and then expanded plastics moldings are prepared from them by molding in the manner described in Example 1.

For comparison, six further batches of beads are coated with the same amounts of the same organic compounds and then pre-expanded and moldings are made from the pre-expanded material by molding in the same manner.

The cooling period is then determined for each of the twelve samples. The results are given in the table:

| Organic compound | Cooling period in minutes | |
|---|---|---|
| | A | B |
| Paraffin oil | 70 | 35 |
| Solid paraffin (melting range 60° to 70° C.) | 90 | 50 |
| Heptane | 90 | 50 |
| Beeswax | 100 | 55 |
| Oleic acid | 95 | 53 |
| Di-(2-ethylhexyl)-adipate | 75 | 40 |

NOTE.—Cooling periods A relate to the beads which have been coated prior to pre-expansion and cooling periods B relate to the beads which are first pre-expanded, kept for six hours and then coated.

Example 3

The following products are used in this example:
(a) A copolymer of 95 parts of styrene and 5 parts of acrylonitrile containing 6.5% of pentane, on the polymer, in the form of bead particles having a diameter of from 0.8 to 2.0 mm. (b) Polystyrene, containing 1.4% of hexabromocyclododecane, 0.2% of dicumyl peroxide and 6.5% of pentane, on the polystyrene, in the form of bead particles having a diameter of from 0.8 to 2.0 mm.

Products (a) and (b) are pre-expanded in flowing steam to a bulk density of 16 g./l., kept for twenty hours and then coated with 0.35% of paraffin oil in each case. Immediately after having been coated, the pre-expanded products (a) and (b) are molded under the action of steam at 0.8 atmosphere gauge in a perforated mold having the dimensions 50 x 100 x 100 cm. to form blocks. The action of the steam at 0.8 atmosphere gauge lasts for thirty seconds.

For comparison, other samples of the products (a) and (b) are coated with the same amount of paraffin oil prior to pre-expansion and then pre-expanded and molded in the same manner. The results are given in the Table in which CT gives the cooling period in minutes and F gives the percentage of fused particles in the case of A: the samples which have been coated after pre-expansion, and B: coated prior to pre-expansion:

| Product | CTA | FA | CTB | FB |
|---|---|---|---|---|
| (a) | 10 | 80 | 60 | 80 |
| (b) | 5 | 70 | 45 | 70 |

We claim:
1. In a method for the production of an expanded plastic molding by heating a pre-expanded particulate expandable styrene polymer containing a volatile organic compound which does not dissolve the styrene polymer and which has a boiling point below the softening point of the styrene polymer as a foaming agent in a mold which is not gastight when closed to a temperature above the softening point of the styrene polymer, the improvement which comprises: using as said pre-expanded styrene polymer, expandable particles which have been coated after pre-expansion and before complete expansion with 0.01 to 2% by weight of the styrene polymer of an organic compound which is substantially water insoluble and which does not dissolve or swell the styrene polymer, said organic compound having a boiling point of more than 95° C. and a softening point of not more than 120° C., said organic compound being selected from the group consisting of paraffins, chloroparaffins, fatty acids having 5 to 32 carbon atoms, esters of a fatty acid and an aliphatic hydrocarbon substituted by at least one hydroxy group, esters of a fatty acid and an aliphatic hydrocarbon substituted by at least one hydroxy group and in which at least one methylene group is substituted by an oxygen atom, esters of an alcohol as defined and an alkane substituted by at least two carboxy groups, and esters of an alcohol as defined and a hydrocarbon of the benzene series substituted by at least two carboxy groups.

2. An improved expanded plastic molding when obtained by the method as claimed in claim 1.

References Cited

UNITED STATES PATENTS 2,894,918  7/1959  Killoran et al.
2,989,782  6/1961  Barkhuff et al.
3,060,138  10/1962  Wright.
3,086,885  4/1963  Jahn.

SAMUEL H. BLECH, Primary Examiner

M. FOELAK, Assistant Examiner

U.S. Cl. X.R.

117—100, 138; 260—45;264—53